Feb. 10, 1959 W. E. SCHIRMER 2,872,992
DRIVE MECHANISM FOR TRAILER
Filed Jan. 27, 1955
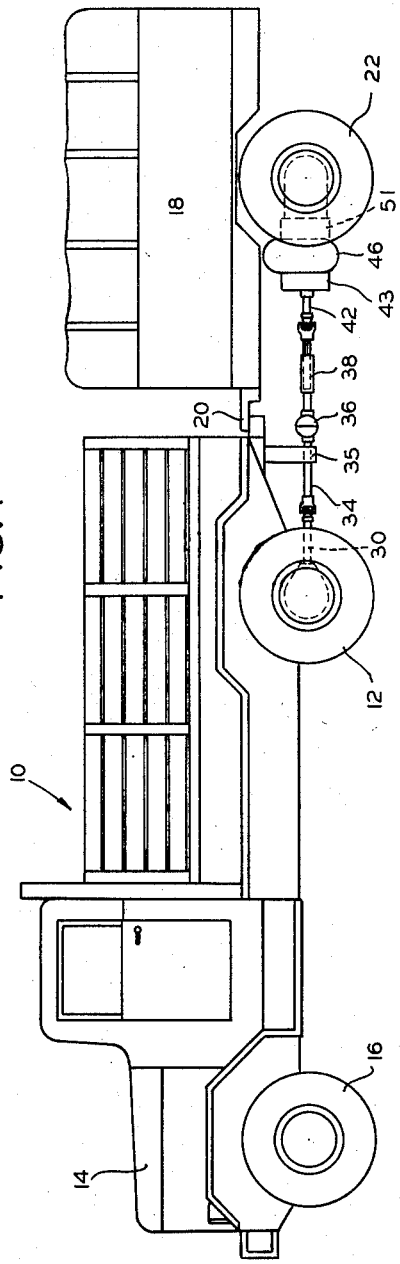
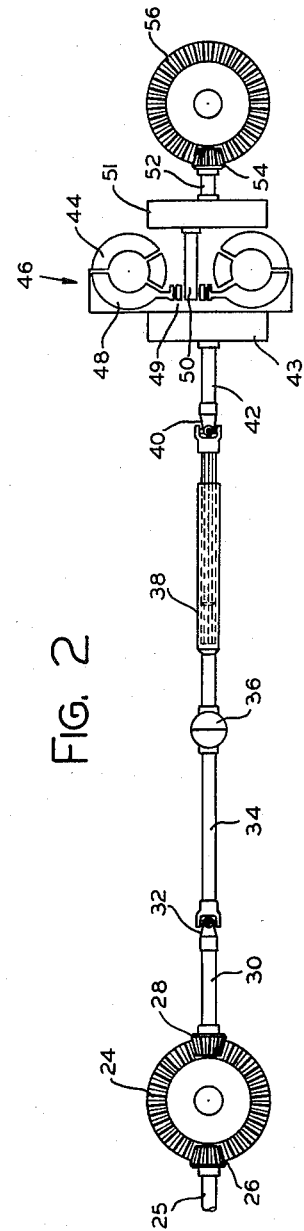
INVENTOR.
WALTER E. SCHIRMER
BY
Kenneth C. Witt
ATTY.

United States Patent Office 2,872,992
Patented Feb. 10, 1959

2,872,992

DRIVE MECHANISM FOR TRAILER

Walter E. Schirmer, Buchanan, Mich., assignor to Clark Equipment Company, a corporation of Michigan Application January 27, 1955, Serial No. 484,510

7 Claims. (Cl. 180—14)

This invention relates to drive mechanisms of the type which is useful for transmitting power from a truck to a trailer in order to drive the wheels of the latter or between two driven axles of a self-propelled vehicle.

More specifically, the present invention provides a means for supplementing the torque application of the power source to the normal driving means of a vehicle by transmitting, under predetermined conditions, a portion of this torque to a secondary driving means.

In general, the present invention is applicable to a truck-trailer combination, utilizing a trailer axle as the supplemental driving means, or to a truck having a plurality of driving axles, only one of which is driven under normal conditions. This is of particular utility in off-the-highway type vehicles, such as military vehicles, logging and oil field equipment, where ice, snow or mud may prevent effective application of tractive effort to the normal drive wheels and the transfer of torque to the secondary axle of the unit or trailer will assist in keeping the vehicle from becoming mired.

Thus the primary object of this invention is to provide a drive mechanism which transmits torque from the first to the second of a pair of drive axles only when one or both of the wheels on the first drive axle are slipping, so that whenever such slipping occurs the second axle will begin to drive and aid the first axle.

In carrying out my invention in one preferred form, I provide a drive mechanism for driving the wheels of a two-wheeled trailer which is pulled by a truck. This drive mechanism includes a propeller shaft driven by the ring gear of the differential in the truck drive axle. This shaft is provided with universal joints and a telescoping section to accommodate movements of the trailer with respect to the truck.

Mounted on the trailer and driven by the propeller shaft is a torque converter. The latter in turn transmits torque to the axle of the trailer through a one-way clutch in order to drive the trailer axle whenever one or both of the drive wheels of the truck begins to slip under adverse conditions.

For a clearer and more complete understanding of my invention reference should be had to the accompanying drawing in which Figure 1 is a side elevational view of a truck and trailer embodying the drive mechanism of my invention, while Figure 2 shows in a partially schematic view the elements of the drive mechanism in greater detail.

Referring to the drawing, the numeral 10 indicates generally a truck which may be of conventional construction except for the arrangement described in detail hereinafter for driving a power take-off shaft from the rear axle of the truck. The truck 10 includes a pair of rear drive wheels 12 (only one of which appears in the drawing) and these wheels are driven by means of a drive axle which includes a differential in the usual manner. This drive axle may be driven from a prime mover located at the front of the truck beneath hood 14, the prime mover being connected to the rear drive axle by means of a transmission and propeller shaft as is customary for vehicles of this type. The truck 10 also includes front dirigible wheels 16 which are arranged to be turned by the operator's steering wheel in order to steer the vehicle.

As shown, a two-wheeled trailer 18 is connected to the truck by means of a hitch at 20. The trailer includes a pair of wheels 22 (only one of which is visible in the drawing) mounted on a driving axle and arranged to be driven under certain conditions, as described in detail hereinafter.

The differential for the drive axle of the truck includes the usual ring gear 24 which may be seen in Figure 2 of the drawing. The propeller shaft which is designated by the numeral 25, operates pinion 26 to drive this ring gear and ring gear 24 in turn drives the rear wheels 12 of the truck through a conventional differential.

The ring gear 24 is also arranged in this case to drive another gear 28 which is mounted on a shaft 30. Shaft 30 is connected by means of a universal joint 32 to another shaft section 34. Section 34 is supported on the truck by means of a bracket 35 (see Figure 1).

Shaft section 34 is connected through another universal joint 36, of a known type which will permit a large amount of angular variation between the connected shafts, to a telescoping shaft section 38, and the latter is connected through a universal joint 40 to still another shaft section 42. Shaft section 42 is connected through a speed increasing gear mechanism 43 of conventional construction to the impeller 44 of a torque converter which is designated generally by the numeral 46. The turbine 48 of the torque converter is connected through a one-way clutch 49, an intervening shaft section 50, and a speed reducing gear mechanism 51 to a shaft section 52 which has mounted thereon a bevel pinion 54. This pinion meshes with another ring gear 56 which in the present mechanism forms a portion of another conventional differential and operates axle shafts which are connected to the wheels 22 of the trailer.

In operation, the rotation of ring gear 24 as the truck 10 is driven forwardly operates gear 28 and revolves the shaft means which includes shaft sections 30, 34, 38 and 42 and the intervening universal joints. Preferably gear 28 has the same number of teeth as pinion 26 so that the shaft means 30, 34, 38, 42 operate at the same speed as the main propeller shaft 25. Shaft section 42 revolves impeller member 44 of the torque converter which under normal conditions operates the turbine 48 of the torque converter at approximately the same speed at which impeller 44 is turning. The turbine 48 is connected to shaft 50 through one-way clutch 49 but ordinarily shaft 50 overruns the turbine 48, so that no torque is transmitted from the turbine to shaft 50.

Shaft 50 overruns the turbine because it is driven through shaft 52 and gear mechanism 51 by ring gear 56 which is operated by the wheels of the trailer. If the tires on the trailer are of the same diameter as the tires on the rear drive wheels of the truck, and the gear ratio between 54 and 56 is the same as the ratio between 24 and 28, and the gear ratio of 43 is the same as 51, the shaft 52 rotates at the same speed as the main propeller shaft 25 and the intervening shaft means 30, 34, 38, 42. Under these conditions the shaft 50 overruns the turbine 48 very slightly because there is only a small difference in speed between impeller 44 and turbine 48 under no load conditions. The turbine 48 operates at a slightly lower speed than the impeller due to the drag of the fluid in the torque converter and the one-way clutch and other elements of the system.

The preceding paragraphs describe the normal operation of the vehicle 10 and the trailer 18 as the latter is being towed by the former on firm ground, under conditions such that there is no slippage of either of the wheels 12 of the vehicle 10. If, however, operation of the vehicle and trailer is taking place in terrain in which one or both of the drive wheels 12 of the vehicle 10 slips, due to a steep grade or slippery condition for example, then the wheels 22 of the trailer will begin to drive to aid the drive wheels of the truck. This action occurs because a slippage of one or both of the wheels 12 of the truck causes the truck and trailer to move at a slower than normal speed relative to the speed of shaft 25 and the shaft means 30, 34, 38, 42. Since shaft 50 is driven by the motion of the trailer, shaft 50 will attempt to slow down to a slower speed than turbine 48. The one-way clutch 49 will not permit this to take place and torque is transmitted from the torque converter to the axle of the trailer to drive the trailer wheels.

The greater the differential in speed between shaft means 30, 34, 38, 42 and shaft 52 due to spinning of the truck drive wheels and consequent slowing down of the truck and trailer, the greater will be the torque transmitted to the wheels of the trailer. The operation of torque converter 46 is dependent upon the differential in speed between impeller 44 and turbine 48, and within limits of normal operation the greater this differential becomes the greater is the torque multiplication. Thus, when a torque converter is employed as described and illustrated herein, not only is torque transmitted to the trailer wheels when it is needed to aid the drive wheels of the towing vehicle, but this torque is multiplied as the need for torque at the trailer wheels becomes greater.

Thus, I have provided a drive mechanism which is very useful in many types of operations such as off-highway work, military operations and the like.

With reference to the step-up gear mechanism 43 and the step-down gear mechanism 51 it should perhaps be pointed out that these mechanisms have been included in the drive mechanism illustrated and described herein merely to enable the torque converter to be operated at a higher speed than shaft means 30, 34, 38, 42 and shaft 52. Ordinarily a higher speed than that at which these shafts operate is required for efficient operation of the torque converter; however, it may be possible to eliminate gear mechanisms 43 and 51 in some cases if desired.

It is also possible, when drive wheels 12 are of a different diameter than drive wheels 22, such as is the case with a farm tractor towing a trailer load of produce, or the like, to revise the gearing relationships so as to maintain the same relative rotation of shafts 42 and 52 under normal driving conditions.

While I have illustrated and described my invention as employing a torque converter as the hydrodynamic torque transmitting means, it will be understood that a fluid coupling which provides no torque multiplication may be substituted for the torque converter in some cases if desired.

It will be apparent also that my invention is not limited to use with a two-wheeled trailer drawn by a truck but may be adapted for use with other trailers, including those equipped with endless tracks, or multiple axles.

Moreover, the invention is useful with tandem drive axles on a truck or other self-propelled vehicle. When used in this manner the second of the tandem axles would drive and aid the first or main drive axle only when the wheels of the latter axle begin to slip.

Thus, while I have described and illustrated herein a preferred embodiment of my invention, it will be understood that modifications may be made without departing therefrom. I intend to cover by the appended claims all such modifications which fall within the true spirit and scope of my invention.

What I claim as new and desire to secure by Letters Patent of the United States is:

1. A drive mechanism for a trailer which is adapted to be drawn by a self-propelled vehicle, comprising first shaft means for deriving power from the self-propelled vehicle, hydrodynamic torque transmitting means driven by the said first shaft means, axle means for driving the trailer, additional shaft means for driving the said axle means, and a one-way clutch connected between the said hydrodynamic torque transmitting means and the said additional shaft means for transmitting torque therebetween whenever the said additional shaft means attempts to operate at a lower speed than the torque output element of the said hydrodynamic torque transmitting means.

2. A drive mechanism for a wheeled trailer which is adapted to be drawn by a self-propelled vehicle, comprising first shaft means for deriving power from the self-propelled vehicle, a torque converter including an impeller element and a turbine element, the impeller element being connected to and driven by the said first shaft means, axle means for driving the wheels of the trailer, additional shaft means connected to and arranged to drive the said axle means, and a one-way clutch connected between the said torque converter and additional shaft means and arranged for transmitting torque therebetween only when the rotation of the trailer wheels acting through the said axle means causes the said additional shaft means to attempt to operate at a lower speed than the said turbine element of the torque converter.

3. A drive mechanism for a wheeled trailer which is adapted to be drawn by a self-propelled vehicle having a rear driving axle equipped with a differential including a ring gear, the drive mechanism comprising telescopic shaft means including universal joints for deriving power from the ring gear of the differential of the self-propelled vehicle, a torque converter having an impeller element and a driven element with the impeller element connected to and driven by the said telescopic shaft means, axle means connected to the wheels of the trailer and arranged to drive and be driven by these wheels, additional shaft means connected to the said axle means and arranged to drive and be driven by the said axle means, and a one-way clutch connected between the driven element of the said torque converter and the said additional shaft means, and the foregoing elements being arranged in a manner such that during normal operation of the vehicle in towing the trailer the impeller element of the torque converter is operated by the telescopic shaft means at a speed which causes the turbine element of the torque converter to be rotated at a slightly slower speed than the speed at which the said additional shaft is operated by the wheels of the trailer and the additional shaft overruns the said driven element, but when one or more rear drive wheels of the truck slips and the difference in the relative speeds between the ring gear and the trailer wheels changes a predetermined amount of torque is transmitted through the torque converter to drive the trailer wheels.

4. A drive mechanism for a plurality of drive axles, comprising first shaft means for operating a first drive axle, second shaft means driven by said first shaft means at a speed proportional to the speed of the said first shaft means, hydrodynamic torque transmitting means driven by the said second shaft means, and an overrunning clutch connected between the said hydrodynamic means and a second drive axle for transmitting torque to the said second axle whenever the relation between speed of the said second shaft means and the speed of the said second axle exceeds a predetermined ratio.

5. A drive mechanism for a vehicle having a pair of drive axles, comprising first shaft means for operating the first drive axle, second shaft means driven by the said first shaft means, hydrodynamic torque transmitting means including an impeller element and a turbine element, the impeller element being connected to and driven by the said second shaft means, third shaft means arranged to drive and be driven by the second drive axle, the said third shaft means being connected to the said turbine element, and a one-way clutch connected between the said turbine element and the said third shaft means, whereby during normal operation of the vehicle the slip in the said hydrodynamic torque transmitting means causes the said third shaft means driven by the second axle to overrun the said turbine element, but a predetermined slippage by the wheels on the first axle causes the speed of the said second shaft means and the impeller element connected thereto to exceed the speed of the turbine element by an amount such that the turbine element catches up with the said third shaft means and thereafter during the continuance of such slippage torque is transmitted to the second axle for driving the wheels mounted thereon.

6. A drive mechanism comprising a first driving axle including driven wheels, a second driving axle including driven wheels, and coupling means driven by said first axle and connected to said second axle and including hydrodynamic torque multiplying means and overrunning clutch means operable for transmitting driving torque to said second axle only when said first axle tends to overrun said second axle in speed of rotation of the respective driven wheels.

7. A drive mechanism comprising a first driving axle including driven wheels, a second driving axle including driven wheels, hydrodynamic torque transmitting means driven by said first axle, and one-way clutch means connected between said hydrodynamic means and said second axle for transmitting torque from said first to said second axle only when said first axle tends to overrun said second axle in speed of rotation of the respective driven wheels.

References Cited in the file of this patent

UNITED STATES PATENTS

| | | |
|---|---|---|
| 1,390,986 | Dain | Sept. 20, 1921 |
| 1,738,212 | Smith | Dec. 3, 1929 |
| 1,926,935 | Bottini | Sept. 12, 1933 |
| 2,659,246 | Norelius | Nov. 17, 1953 |
| 2,693,120 | Maybach | Nov. 2, 1954 |
| 2,711,222 | Bock | June 21, 1955 |